United States Patent [19]

Joseph

[11] Patent Number: 4,964,492

[45] Date of Patent: Oct. 23, 1990

[54] DAMPER FOR A HYDROPNEUMATIC SUSPENSION ELEMENT OF A VEHICLE, AND IN PARTICULAR A HEAVY VEHICLE

[75] Inventor: Philippe Joseph, Carpentras, France

[73] Assignee: S.A.M.M.-Societe d'Applications des Machines Motrices, Bievres, France

[21] Appl. No.: 314,859

[22] Filed: Feb. 24, 1989

[30] Foreign Application Priority Data

Feb. 26, 1988 [FR] France .................. 88 02426

[51] Int. Cl.⁵ .................. B60G 17/08; F16F 9/46; F16F 9/50
[52] U.S. Cl. .................. 188/299; 188/322.14
[58] Field of Search ............ 188/299, 322.13, 322.14, 188/322.15, 281, 282, 266, 267, 269, 322.22, 319, 316, 303, 304; 280/707, 714; 267/64.11, 64.15

[56] References Cited

U.S. PATENT DOCUMENTS

| | | | |
|---|---|---|---|
| 1,965,473 | 7/1934 | Simon | 188/299 X |
| 3,548,977 | 12/1970 | Morgan | 188/299 X |
| 3,559,776 | 2/1971 | Schultze | 188/299 |
| 4,061,295 | 12/1977 | Somm | 188/299 X |
| 4,513,833 | 4/1985 | Sheldon | 188/299 X |
| 4,620,620 | 11/1986 | Johnston et al. | 188/299 X |
| 4,671,392 | 6/1987 | Wössner | 188/299 |
| 4,673,067 | 6/1987 | Münning et al. | 188/285 X |
| 4,685,545 | 8/1987 | Fannin et al. | 188/299 |
| 4,754,855 | 7/1988 | Kuwana et al. | 188/299 |
| 4,768,628 | 9/1988 | Philippe et al. | 188/322.14 X |
| 4,776,437 | 10/1988 | Ishibashi et al. | 188/299 |
| 4,779,560 | 10/1988 | Patrick et al. | 188/303 X |
| 4,800,995 | 1/1989 | Bernhardt et al. | 188/299 X |
| 4,821,851 | 4/1989 | Kruckemeier et al. | 188/299 X |
| 4,858,736 | 8/1989 | Arnaud et al. | |

FOREIGN PATENT DOCUMENTS

| | | |
|---|---|---|
| 0186167 | 7/1986 | European Pat. Off. |
| 0207409 | 1/1987 | European Pat. Off. ............ 188/299 |
| 3231739 | 3/1984 | Fed. Rep. of Germany. |
| 2579935 | 10/1986 | France. |
| 2609131 | 12/1986 | France. |
| 2585795 | 2/1987 | France .................. 188/299 |
| 2620385 | 3/1989 | France. |
| 0042570 | 4/1979 | Japan .................. 188/322.14 |
| 60-151440 | 8/1985 | Japan. |
| 61-75007 | 4/1986 | Japan. |

OTHER PUBLICATIONS

Patent Abstract of Japan, vol. 9, No. 316 (M-438) [2039], Dec. 12, 1985.
Patent Abstract of Japan, vol. 10, No. 246 (M-510) [2302], Aug. 23, 1986.

Primary Examiner—Douglas C. Butler
Attorney, Agent, or Firm—Sughrue, Mion, Zinn, Macpeak & Seas

[57] ABSTRACT

The damper comprises a fixed body (1A, 1B) provided with ports (3, 4) for the passage of hydraulic fluid, stacks (7) of flexible washers disposed in rigid deflectors (8) placed on each side of the body (1A, 1B) in facing relation to the ports (3, 4) and recesses and tubular inserts (5, 6) for allowing the passage of the fluid in only one direction for some ports (3) and in the opposite direction for the other ports (4). A disc (9) provided with at least two series of orifices (11, 12) having different diameters is disposed in the body. The orifices are arranged to be capable of coming into confronting relation with the ports (3, 4) of the body. The disc (9) is rotated through a given angle so as to place one of the series of orifices of the disc (9) in correspondence with the ports (3, 4) of the body. This arrangement permits adjusting the degree of damping so as to obtain the desired hardness or softness for the suspension in accordance with the utilization of the vehicle.

16 Claims, 4 Drawing Sheets

DAMPER FOR A HYDROPNEUMATIC SUSPENSION ELEMENT OF A VEHICLE, AND IN PARTICULAR A HEAVY VEHICLE

The present invention relates to a damper for a hydropneumatic suspension of a vehicle, and in particular a heavy vehicle, and to a device including said damper and a control system.

French patent application No. 86 18 208 in the name of the Applicant in particular discloses a damper comprising a fixed body provided with ports for the passage of the hydraulic fluid from one side to the other of said body, stacks of elastically flexible metal washers disposed in rigid deflectors located on each side of the body in facing relation to the passage ports of the body, and means for allowing the passage of the fluid in only one direction for certain ports, and in the opposite direction for the other ports.

A damper of this type does not permit varying the degree of damping, and therefore the degree of hardness or softness of the suspension element so as to adapt the suspension to the type of ground or the utilization of the vehicle.

An object of the invention is therefore to propose an improved damper of the aforementioned type, arranged in such manner as to permit the adjustment of the degree of damping.

According to the invention, the damper comprises a disc provided with at least two series of orifices of different diameters for the passage of the fluid and corresponding to different adjustments of the damping, disposed in the body, the orifices being arranged to be capable of coming into facing relation to the ports of the body, means for rotating said disc through a given angle so as to place one of the series of orifices of said disc in correspondence with the ports of the body, and means for controlling the rotation of the disc.

The degree of damping will therefore be different depending on whether one or the other of the two series of orifices of the disc is placed in facing relation to the ports of the fixed body.

According to one embodiment of the invention, the means for rotating the disc comprise: a tube axially extending through the fixed body and the disc and connected to the body, a bar located in the centre of the disc and in the plane of the latter, connected to the disc and having end portions extending through openings provided in the tube, a tubular sleeve axially slidably mounted in the tube, prevented from rotating in the latter and in which are provided elongated slots inclined to the axis of the tube and damper, said slots receiving opposite ends of the bar.

According to a feature of the invention, the fixed body is formed by two distinct body parts provided with ports and between which the rotary perforated disc is interposed.

According to a possible embodiment of the damper, in which the disc is provided annularly with two series of orifices of different diameters, the means for controlling the rotation of the disc comprise an electromagnet mounted on a support fixed to said tube, an iron connected to one end of the tubular sleeve, placed in the electromagnet in such manner as to drive the tubular sleeve in axial translation when the electromagnet is energized through suitable electric connections and thereby produce a rotation of the disc through a given angle, and elastic return means are provided for returning the tubular sleeve and the disc to their initial position when the electromagnet is not energized.

Further features and advantages of the invention will be apparent from the following description which is given with reference to the accompanying drawings illustrating two embodiments by way of non-limitative examples.

Figure 1:
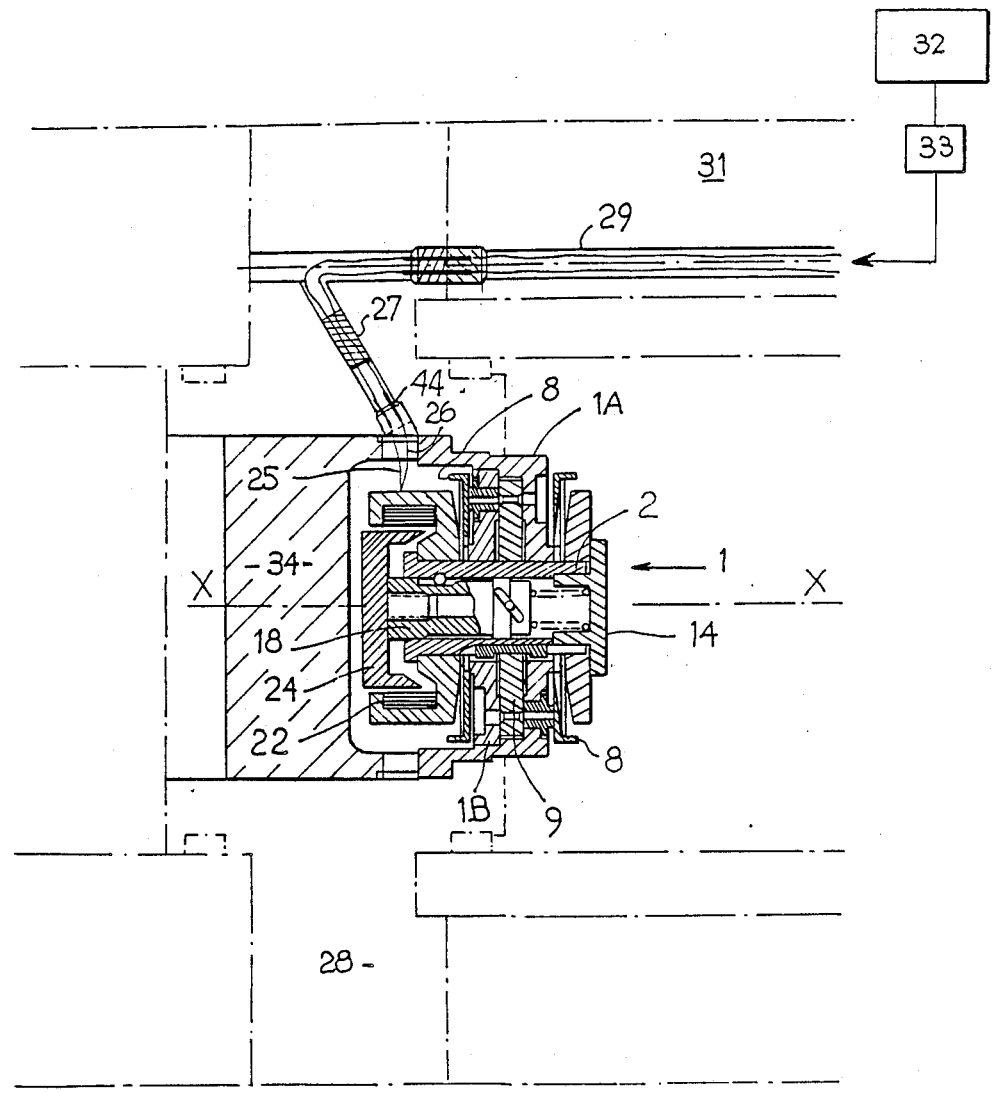
FIG. 1 is an axial sectional view of a first embodiment of the damper according to the invention and its control system, this view also showing diagrammatically and partly the environment of the damper in the corresponding suspension element.
Figure 2:
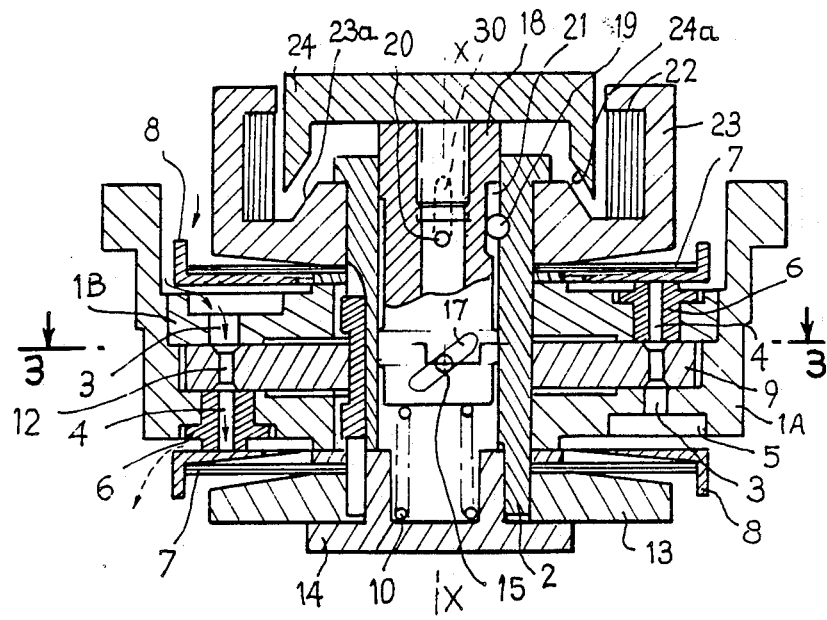
FIG. 2 is an axial sectional view to an enlarged scale of the damper of FIG. 1.
Figure 3:
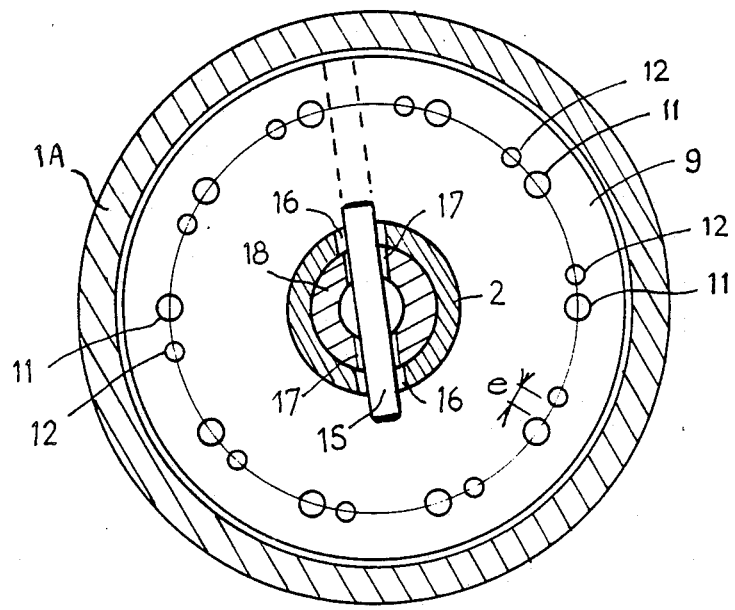
FIG. 3 is a sectional view taken on line 3—3 of the damper of FIGS. 1 and 2.
Figure 4:
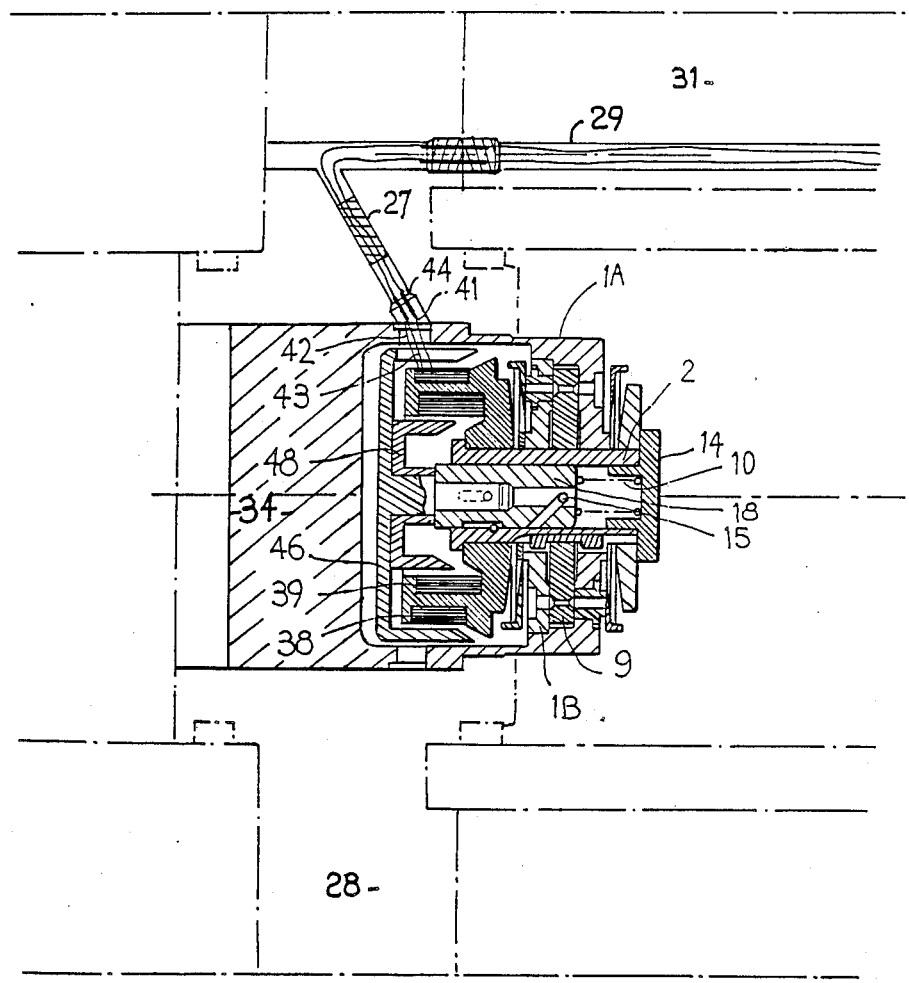
Figure 5:
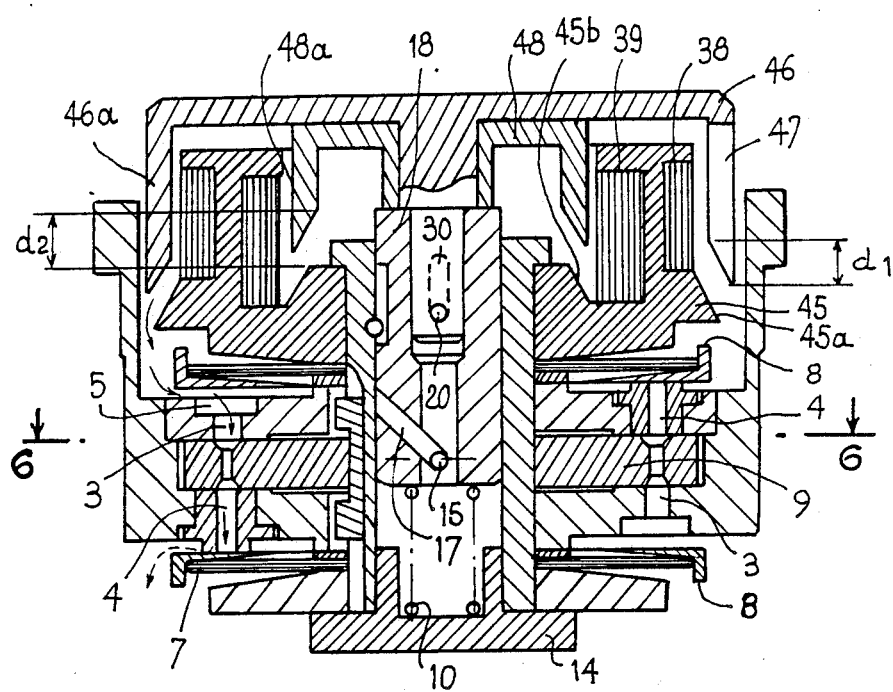
Figure 6:
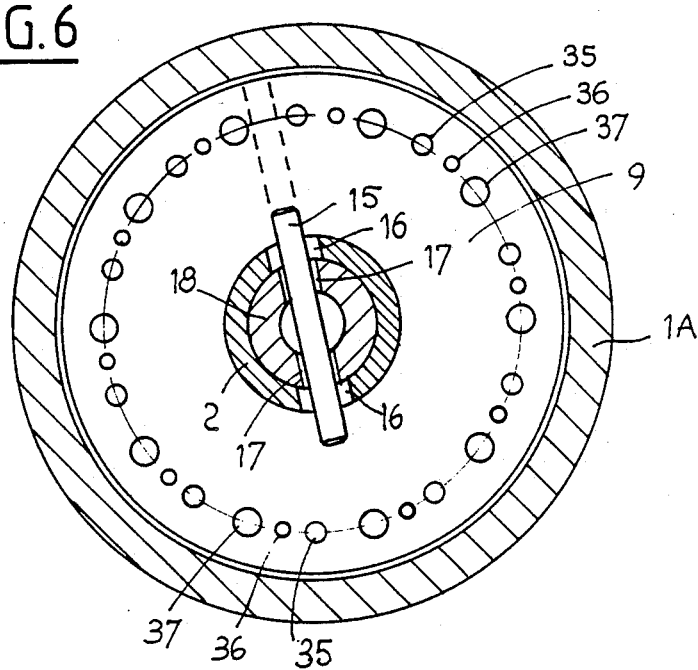

FIGS. 4, 5 and 6 are views similar to FIGS. 1, 2 and 3 respectively illustrating a second embodiment of the damper according to the invention, FIG. 6 being a sectional view taken on line 6—6 of FIG. 5.

Figure 7:
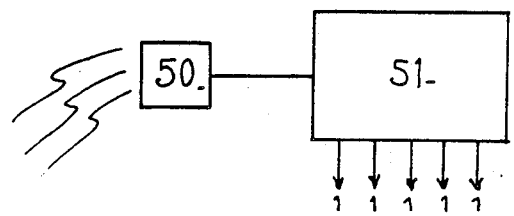

FIG. 7 is a diagram of the principle of an automatic control systems for dampers to which the invention also relates.

The damper shown in FIGS. 1 to 3 is adapted to equip a hydropneumatic suspension element of a vehicle, and in particular a heavy vehicle, such as for example that disclosed in the aforementioned French Patent Application No. 86 18 208.

This damper 1 comprises a fixed body constituted in the presently-described embodiment by two distinct parts 1A and 1B of revolution about an axis X—X and provided with axial openings through which extends a tube 2 to which the two parts 1A and 1B of the body 1 are fixed. Each part 1A and 1B is provided with ports 3, 4 for the passage of the hydraulic fluid and spaced apart annularly. The ports 3 open onto recesses 5 in the corresponding surface of the part 1A and 1B and the ports 4 are bores of tubular inserts 6 disposed in the body and having one end portion projecting relative to the corresponding surface of the parts 1A and 1B. The ports 3 and 4 are arranged in accordance with an alternating arrangement so that the ports 4 of the part 1B correspond to the ports 3 of the part 1A and inversely.

Furthermore, in a manner similar to the arrangement disclosed in the French patent application No. 86 18 208, the damper 1 comprises stacks 7 of elastically flexible metal washers through which extends the central tube 2 and which are disposed in rigid annular deflectors 8 placed on each side of the body 1A, 1B in facing relation to the ports 3 and 4. The reflectors 8 are elastically maintained by the stacks in bearing relation against the projecting end portions of the inserts 6 so long as the hydraulic pressure in the ports is insufficient to shift them away from these inserts 6, while the hydraulic fluid is free to pass between the same inserts 8 and the ports 3 owing to the spacing between the inserts 8 and the recesses 5.

The damper 1 comprises a disc 9 provided with two series of orifices 11, 12 arranged on a circle of axis X—X and having different diameters. These orifices are grouped in pairs in facing relation to the ports 3, 4 with a spacing e between the two orifices 11, 12 of each pair which is less than the diameter of the ports 3, 4 of the body 1A,1B.

The damper comprises means for rotating the disc 9 through a given angle equal to the angular sector between the centres of two consecutive orifices 11, 12. This permits placing either one of the series of orifices 11 and 12 in facing relation to the ports 3, 4 for varying the degree of damping.

In the described embodiment, these means comprise the tube 2 to one end of which is fixed a washer 13 and an end wall 14, a bar 15 located in the centre of the disc 9 and in the plane of the latter, connected to the disc by the ends of the bar which extend through openings 16 in the tube 2 and elongated slots 17 provided in a tubular sleeve 18 axially slidably mounted in the tube 2. The slots 17 are inclined to the axis X—X and the sleeve 18 is slidable in the tube 2 in opposition to the opposing force exerted by an elastic return means constituted in the present embodiment by a coil spring 10 placed in bearing relation to the end wall 14. The sleeve 18 is prevented from rotating, relative to the tube 2, by any suitable means, such as a pin 19 partly engaged in the inner wall of the tube 2, the projecting portion of the pin being received in a longitudinal groove 21 provided in the sleeve 18.

The damper is provided with means for controlling the rotation of the disc 9 which comprise, in the presently-described embodiment, an electromagnet 22 mounted on a support 23 formed by a cup fixed to the end of the tube 2 remote from its cap 14. The electromagnet 22 is associated with an iron 24 connected to the end of the sleeve 18 opposed to the spring 10. The iron 24 is placed in the electromagnet 22 in such manner as to drive the sleeve 18 in axial translation against the return force exerted by the spring 10 when the electromagnet 22 is energized through suitable electric connections 25, 26 (FIG. 1). When the electromagnet 22 is not energized, the spring 10 maintains the sleeve 18 and the iron 24 in their position of rest shown in FIG. 2, in which one of the two series of orifices 11, 12 open onto the ports 3 and 4.

The electric conductors 25, 26 extend through a plug 44 and a passage 27 provided in a capacitor 28 and are embedded in glass poured in the passage 27 so as completely close it and be capable of resisting extremely high pressures (which may be on the order of 1 000 bars) inside the damper 1. Beyond the passage 27, the electric conductors 25, 26 extend through a conduit 29 inside a housing 31.

The control circuit of the damper is completed by a hand knob 32 and optionally by a time delay device 33 connected to the connections 25, 26. The suspension element comprises a piston 34 and may be of any type, for example one of those disclosed in the French patent applications of the Applicant No. 85 05 067, of Apr. 3, 1985 (now French Pat. No. 2,579,935) 86 18 208, of Dec. 26, 1986 (now French Pat. No. 2,609,131 corresponding to U.S. Pat. Nos. 4,858,736 Arnaud et al. and 87 12 567, of Sep. 10, 1987 (now French Pat. No. 2,620,385).

At least one axial slot 30 is provided in the tube 2 and extending through this slot is a lug 20 fixed to the sleeve 18 and slidable in this slot. The ends of the slot 30 form stop abutments for the sliding movements of the sleeve 18.

The damper thus described operates in the following manner:

At rest, the electromagnet 22 is non energized, the spring 10 is extended and maintains the sleeve 18 in the position shown in FIG. 2 in which it bears against the stop abutment. The disc 9 is in such angular position that the orifices 11 of larger diameter are in correspondence with the ports 3 and 4. The orifices 11 of larger diameter are used for the normal running of the vehicle in which they provide the vehicle with a relatively soft suspension.

If it is desired to temporarily harden the suspension so as to damp or absorb a shock or a sudden vibration due to the utilization of the vehicle (for example the firing of a gun on a battle tank), the control knob 32 is actuated so as to energize the electromagnet 22. The iron 24 is moved axially and drives the sleeve 18 until the bevelled periphery 24a of the iron 24 abuts against a corresponding surface 23a of the support 23. In the course of this axial translation, the bar 15 drives the disc 9 in rotation owing to the axial displacements of the slots 17. At the end of this rotation through an angle equal to the angular sector separating two consecutive orifices 11 and 12, the orifices 12 of smaller diameter are located in facing relation to the ports 3 and 4.

The disc 9 returns to its initial position after ceasing the energization of the electromagnet 22, under the action of the return spring 10.

The use of the time delay device 33 may be of utility for automatically putting the damper in the "hard" position (i.e. that in which the orifices 12 of small diameter are employed), in particular for the automatic preparation for firing from an armoured vehicle.

It is important to note that the spacing e between the two orifices 11, 12 of the same pair must be less than the diameter of the ports 3 and 4, so that, irrespective of the angular position of the disc 9, a passage is always possible for the hydraulic fluid, this being clearly essential for the safety of operation of the damper and suspension.

The second embodiment of the damper shown in FIGS. 4 to 6 differs from the foregoing damper in that the disc 9 is provided annularly with three series of orifices 35, 36, 37 of different diameters and grouped three by three. Two electromagnets 38, 39 for controlling the disc 9 are correspondingly provided.

The orifices 36 of the smallest size correspond to the hard suspension, the orifices 37 of larger diameter correspond to a flexible suspension, and the orifices 35 of intermediate diameter correspond to a normal suspension in which the spring 10 is extended and the electromagnets 38, 39 are non energized. The latter are connected to three conductors 41, 42, 43 which extend through an electric plug 44 in accordance with an arrangement similar to that of the foregoing embodiment.

The electromagnets 38, 39 are coaxially mounted on a support 45 connected to the end of the tube 2 opposed to the end wall 14. Associated with the outer electromagnet 38 is a cup-shaped iron 46 in which is provided a notch 47 for the passage of the conductors 41, 42, 43. Disposed under the iron 46 is a second annular iron 48 of smaller diameter which is slidable inside the electromagnet 39. Each iron 46, 48 is provided with a respective flange 46a, 48a whose end is bevelled in such manner as to be capable of abutting against a corresponding surface 45a, 45b on the support 45.

The irons 46, 48 and the inclined surfaces 45a, 45b are so arranged that the iron 46 is axially slidable with the sleeve 18 in a distance d1 when only the electromagnet 38 is energized, the iron 48 being also driven along in this displacement. When the second electromagnet 38 is also energized, it again drives the iron 48 and the sleeve 18 until the bevelled end of the flange 48a abuts against the surface 45b after having travelled through a total distance d2 greater than d1.

The operation of the damper shown in FIGS. 4 to 6 is easily understood:

At rest, the spring 10 is extended and the sleeve 18 and the irons 46, 48 are in the position shown in FIG. 5, the electromagnets 38, 39 being non-energized. The orifices 35 corresponding to the normal travel of the vehicle are placed in facing relation to the ports 3 and 4. The bar 15 is at the end of the slots 17 and the lug 20 is maintained in abutting relation to one end of the slot 30.

When the first electromagnet 38 is energized by shifting the control knob 32, a first axial displacement dl of the iron 48 and the sleeve 18 is brought about and this results in an angular displacement of the disc 9 caused by the bar 15 at the end of which the orifices 36 of the smallest diameter are put into correspondence with the ports 3, 4. The suspension is then "hard". If the electromagnet 39 is in addition energized, this electromagnet causes a new axial sliding of the iron 48 and sleeve 18 which causes a new rotation of the disc 9 until the orifices 37 corresponding to a flexible or soft suspension come into facing relation with the ports 3 and 4.

When the electromagnets 38, 39 are ceased to be energized, the return spring 10 returns the disc 9 and the sleeve 18 to their initial position.

For the various possible embodiments of the damper, the positions of the discs 9 of dampers associated with different suspension elements may be mixed. Thus, the suspension elements located at the centre of the vehicle may be placed in the "hard" position, while the dampers of the suspension elements placed at the ends may be put in the "soft" position, or inversely, for damping the pitching on undulating ground.

It is also possible to replace the manual control by the knob 32 by any other automatic or semi-automatic system, such as the decyphering or reading of the ground by a radar detector 50 (FIG. 7) placed in the front of the vehicle whose records are analyzed by a computer 51 controlling in real time the adjustment of the dampers such as the damper 1.

I claim:

1. A damper for a hydropneumatic suspension element of a vehicle, said damper comprising a fixed body having an axis, ports for the passage of hydraulic fluid through said body provided in the body, rigid deflectors placed on each side of the body in facing relation to the ports of the body, stacks of elastically flexible metal washers located within the deflector on each side of the body, means for allowing the passage of the fluid in only one direction for some of the ports and in the opposite direction for the other ports, a rotatable disc disposed in the body, at least two series of orifices of different diameters provided in the disc for the passage of said fluid and corresponding to different adjustments of the damping, the orifices being arranged to be capable of coming into facing relation to the ports of the body, means for rotating the disc through a given angle so as to place one of said series of orifices in correspondence with the ports of the body, and means for controlling the rotation of the disc.

2. A damper according to claim 1, wherein the means for rotating the disc comprise a tube defining openings and axially extending through the body and the disc and connected to the body, a bar located in the centre of the disc and in the plane of the disc and connected to the disc, opposite end portions of the bar extending through the openings in the tube, a tubular sleeve axially slidably mounted in the tube, means for preventing rotation of the sleeve relative to the tube, and elongated slots provided in the sleeve in a position inclined to the axis of the tube and the body, the opposite end portions of the bar extending through said slots.

3. A damper according to claim 2, wherein the body comprises two distinct body parts provided with the ports and between which body parts the rotatable disc is interposed.

4. A damper according to claim 3, wherein the disc is provided annularly with two series of orifices having different diameters, the means for controlling the disc in rotation comprising a support fixed to said tube, an electromagnet mounted on the support, an iron connected to an end of the sleeve and placed in the electromagnet so as to drive the sleeve from an initial position of the sleeve in translation axially of the tube when the electromagnet is energized, thereby causing a rotation of the disc through a given and elastic return means for returning the sleeve and the iron to the initial position of the sleeve when the electromagnet is not energized.

5. A damper according to claim 3, wherein the disc is provided annularly with three series of said orifices having different diameters, the means for controlling the rotation of the disc comprising a support connected to an end of the tube, a second electromagnet, the electromagnets being mounted in coaxial relation on the support, two irons fixed to an end of the sleeve and each associated with a respective one of the electromagnets so that the energization of the first-mentioned electromagnet causes a first axial displacement of the sleeve and a corresponding rotation of the disc and the consecutive energization of the second electromagnet causes a new axial displacement of the sleeve and a new rotation of the disc, two of the three series of orifices being placed in facing relation to the ports of the body at the end of said successive axial displacements, the elastic return means being arranged to return the sleeve to said initial position thereof when the electromagnets are non-energized in which initial position of the sleeve the third series of orifices is in correspondence with the ports of the body.

6. A damper according to claim 1, wherein the ports are round-sectioned and have a diameter, and two consecutive orifices of different diameter of the disc are spaced apart a distance which is less than the diameter of the ports.

7. A damping device comprising in combination:
a damper for a hydropneumatic suspension element of a vehicle, said damper comprising a fixed body having an axis, ports for the passage of hydraulic fluid through said body provided in the body, rigid deflectors placed on each side of the body in facing relation to the ports of the body, stacks of elastically flexible metal washers located within the deflectors on each side of the body, means for allowing the passage of the fluid in only one direction for some of the ports and in the opposite direction for the other ports, a rotatable disc disposed in the body, at least two series of orifices of different diameters provided in the disc for the passage of said fluid and corresponding to different adjustments of the damping, the orifices being arranged to be capable of coming into facing relation to the ports of the body, means for rotating the disc through a given angle so as to place one of said series of orifices in correspondence with the ports of the body, and means for controlling the rotation of the disc, the body comprising two distinct body parts provided with the ports and between which body parts the rotatable disc is interposed, the disc being provided annularly with two series of orifices having different diameters, the means for controlling the disc in rotation comprising a support fixed a the tube, an electromagnet mounted on the support, an iron connected to an end of a sleeve and placed in the electromagnet so as to drive the sleeve from an initial position of the sleeve in translation axially of the tube when the electromagnet is energized, thereby causing a rotation of the disc through a given angle, and elastic return means for returning the sleeve and the iron to the initial position of the sleeve when the electromagnet is not energized;

and a system for controlling the electromagnet and comprising a hand knob for this purpose.

8. A damping device according to claim 7, comprising a time delay device associated with the hand knob for delaying the control of the electromagnet.

9. A damping device according to claim 7, further comprising an automatic control device connected to the hand knob.

10. A damping device according to claim 7, further comprising a semi-automatic control device connected to the hand knob.

11. A device according to claim 7, wherein the orifices of the disc are disposed in such manner that the controlling of the rotation of the disc selectively places the orifices of smaller diameter and the orifices of larger diameter in correspondence with the ports of the body, the other orifices corresponding to a normal suspension communicating with the ports when the electromagnet is non-energized.

12. A damping device comprising in combination:

a damper for a hydropneumatic suspension element of a vehicle, said damper comprising a fixed body having an axis, ports for the passage of hydraulic fluid through said body provided in the body, rigid deflectors placed on each side of the body in facing relation to the ports of the body, stacks of elastically flexible metal washers located within the deflectors on each side of the body, means for allowing the passage of the fluid in only one direction for some of the ports and in the opposite direction for the other ports, a rotatable disc disposed in the body, at least two series of orifices of different diameters provided in the disc for the passage of said fluid and corresponding to different adjustments of the damping, the orifices being arranged to be capable of coming into facing relation to the ports of the body, means for rotating the disc through a given angle so as to place one of said series of orifices in correspondence with the ports of the body, and means for controlling the rotation of the disc, the body comprising two distinct body parts provided with the ports and between which body parts the rotatable disc is interposed, the disc being provided annularly with two series of orifices having different diameters, the means for controlling the disc in rotation comprising a support fixed to a tube, an electromagnet mounted on the support, an iron connected to an end of a sleeve and placed in the electromagnet so as to drive the sleeve from an initial position of the sleeve in translation axially of the tube when the electromagnet is energized, thereby causing a rotation of the disc through a given angle, elastic return means for returning the sleeve and the iron to the initial position of the sleeve when the electromagnet is not energized, the disc being provided annularly with three series of said orifices having different diameters, the means for controlling the rotation of the disc comprising a support connected to an end of the tube, a second electromagnet, the electromagnets being mounted in coaxial relation on the support, two irons fixed to an end of the sleeve and each associated with a respective one of the electromagnets so that the energization of the first-mentioned electromagnet causes a first axial displacement of the sleeve and a corresponding rotation of the disc and the consecutive energization of the second electromagnet causes a new axial displacement of the sleeve and a new rotation of the disc, two of the three series of orifices being placed in facing relation to the ports of the body at the end of said successive axial displacements, the elastic return means being arranged to return the sleeve to said initial position thereof when the electromagnets are non-energized in which initial position of the sleeve the third series of orifices is in correspondence with the ports of the body;

and a system for controlling the electromagnets and comprising a hand knob for this purpose.

13. A damping device according to claim 12, comprising a time delay device associated with the hand knob for delaying the control of the electromagnets.

14. A damping device according to claim 12, further comprising an automatic control device connected to the hand knob.

15. A damping device according to claim 12, further comprising a semi-automatic control device connected to the hand knob.

16. A device according to claim 12, wherein the orifices of the disc are disposed in such manner that the controlling of the rotation of the disc selectively places the orifices of smallest diameter and the orifices of largest diameter in correspondence with the ports of the body, the other orifices corresponding to a normal suspension communicating with the ports when the electromagnets are non-energized.

* * * * *